United States Patent
Fabian et al.

(10) Patent No.: US 11,447,613 B2
(45) Date of Patent: Sep. 20, 2022

(54) POLYMERIC FOAM COMPRISING LOW LEVELS OF BROMINATED FLAME RETARDANT AND METHOD OF MAKING SAME

(71) Applicant: Owens Corning Intellectual Capital, LLP, Toledo, OH (US)

(72) Inventors: Barbara A. Fabian, Medina, OH (US); S. Thomas Brammer, Kent, OH (US); Yadollah Delaviz, Lewis Center, OH (US); David R. Beatty, Norton, OH (US); William James Ramsey, Tallmadge, OH (US); Troy N. Weyher, Temperance, MI (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/492,155

(22) Filed: Apr. 20, 2017

(65) Prior Publication Data

US 2017/0327659 A1 Nov. 16, 2017

Related U.S. Application Data

(60) Provisional application No. 62/334,511, filed on May 11, 2016.

(51) Int. Cl.
*C08J 9/00* (2006.01)
*C08J 9/12* (2006.01)

(52) U.S. Cl.
CPC .......... *C08J 9/0061* (2013.01); *C08J 9/0014* (2013.01); *C08J 9/122* (2013.01); *C08J 2201/03* (2013.01); *C08J 2323/06* (2013.01); *C08J 2323/12* (2013.01); *C08J 2325/06* (2013.01); *C08J 2353/02* (2013.01); *C08J 2367/02* (2013.01); *C08J 2453/02* (2013.01)

(58) Field of Classification Search
CPC .... C08J 9/0014; C08J 9/0061; C08J 2201/03; C08J 2323/06; C08J 2323/12; C08J 2325/06; C08J 2353/02; C08J 2367/02; C08J 2453/02; C08J 9/122
See application file for complete search history.

(56) References Cited

U.S. PATENT DOCUMENTS

| | | | |
|---|---|---|---|
| 5,149,735 A | 9/1992 | Bressan et al. | |
| 5,470,888 A | 11/1995 | Vonken et al. | |
| 5,484,649 A | 1/1996 | Vonken et al. | |
| 5,639,799 A | 6/1997 | Books et al. | |
| 5,717,001 A | 2/1998 | Books et al. | |
| 6,340,713 B1 | 1/2002 | Gluck et al. | |
| 6,569,912 B1 | 5/2003 | Oohara et al. | |
| 6,579,911 B1 | 6/2003 | Vo et al. | |
| 6,762,212 B2 | 7/2004 | Oohara et al. | |
| 7,468,408 B2 | 12/2008 | Onishi et al. | |
| 7,585,912 B2 | 9/2009 | Kornberg et al. | |
| 7,851,558 B2 | 12/2010 | King et al. | |
| 8,080,592 B2 | 12/2011 | Kruper, Jr. et al. | |
| 8,084,511 B2 | 12/2011 | Hanson et al. | |
| 8,222,307 B2 | 7/2012 | Allmendinger et al. | |
| 8,242,183 B2 | 8/2012 | King et al. | |
| 8,324,288 B2 | 12/2012 | Kruper, Jr. et al. | |
| 8,410,226 B2 | 4/2013 | Hull, Jr. et al. | |
| 8,450,383 B2 | 5/2013 | Hull, Jr. et al. | |
| 8,513,346 B2 | 8/2013 | Falloon et al. | |
| 8,668,850 B2 | 3/2014 | Onishi et al. | |
| 8,901,181 B2 | 12/2014 | Gebraad et al. | |
| 9,051,449 B2 | 6/2015 | Zucchelli | |
| 2006/0084733 A1* | 4/2006 | O'Brien | C08K 5/02 524/100 |
| 2011/0152412 A1 | 6/2011 | Hogt et al. | |
| 2011/0218257 A1* | 9/2011 | Noordegraaf | C08J 9/0066 521/60 |
| 2011/0240906 A1 | 10/2011 | Kram et al. | |
| 2011/0275730 A1 | 11/2011 | Gordon-Duffy et al. | |
| 2011/0284793 A1 | 11/2011 | Ponticiello et al. | |
| 2012/0035286 A1 | 2/2012 | Bellin et al. | |
| 2012/0074347 A1 | 3/2012 | Gordon-Duffy et al. | |
| 2012/0091388 A1 | 4/2012 | Felisari et al. | |
| 2012/0252914 A1 | 10/2012 | Hahn et al. | |
| 2012/0283345 A1 | 11/2012 | Ruckdaschel et al. | |
| 2013/0102703 A1 | 4/2013 | Bar-Yaakov et al. | |
| 2013/0203878 A1 | 8/2013 | Igualada et al. | |
| 2013/0225703 A1 | 8/2013 | Ponticiello et al. | |
| 2013/0249135 A1 | 9/2013 | Kram et al. | |
| 2014/0288203 A1 | 9/2014 | Matsue et al. | |
| 2014/0364524 A1 | 12/2014 | Braun et al. | |
| 2015/0005402 A1 | 1/2015 | Spies et al. | |
| 2015/0166752 A1* | 6/2015 | Scholz | C08J 9/0023 521/79 |
| 2015/0337103 A1 | 11/2015 | Igualada et al. | |

(Continued)

FOREIGN PATENT DOCUMENTS

| | | | | |
|---|---|---|---|---|
| EP | 2706086 A1 * | 3/2014 | ............. | C08J 9/125 |
| EP | 2960272 | 12/2015 | | |
| EP | 3070118 | 9/2016 | | |
| WO | 1992/009651 | 6/1992 | | |
| WO | 2012/024708 | 3/2012 | | |
| WO | 2013/017417 | 2/2013 | | |
| WO | 2013/064444 | 5/2013 | | |
| WO | 2014/027888 | 2/2014 | | |
| WO | 2014/066089 | 5/2014 | | |

(Continued)

OTHER PUBLICATIONS

Tullo, A Polymeric Solution For A Bromine Problem, C&EN, Oct. 2012.*

(Continued)

*Primary Examiner* — Irina S Zemel
(74) *Attorney, Agent, or Firm* — Calfee, Halter & Griswold LLP

(57) ABSTRACT

A composition and method for making polymeric foam is provided. The composition includes a flame retardant composition comprising brominated polymeric compounds. The resulting polymeric foams have a low bromine content of from about 0.01-0.5 wt. %, while maintaining acceptable flame retardant characteristics.

18 Claims, No Drawings

(56) References Cited

U.S. PATENT DOCUMENTS

2015/0344658 A1    12/2015  Masahito et al.
2017/0183471 A1*    6/2017  Kikuchi .................. B29C 48/92

FOREIGN PATENT DOCUMENTS

| WO | 2014/102139 | 7/2014 | | |
|---|---|---|---|---|
| WO | 2014/111628 | 7/2014 | | |
| WO | 2014/111629 | 7/2014 | | |
| WO | 2014/125933 | 8/2014 | | |
| WO | 2014/188848 | 11/2014 | | |
| WO | 2015/049413 | 4/2015 | | |
| WO | 2015/065393 | 5/2015 | | |
| WO | 2015/072514 | 5/2015 | | |
| WO | 2015/101621 | 7/2015 | | |
| WO | 2015/116548 | 8/2015 | | |
| WO | WO-2015170602 A1 * | 11/2015 | ........... | B29C 48/022 |
| WO | 2017/196512 | 11/2017 | | |

OTHER PUBLICATIONS

International Search Report and Written Opinion from PCT/US2017/028495 dated Apr. 20, 2017.

Office Action from Chinese Application No. 201780037743.8 dated Jul. 13, 2020.

Office Action from Chinese Application No. 201780037743.8 dated Apr. 7, 2021.

Office Action from Chinese Application No. 201780037743.8 dated Aug. 25, 2021.

* cited by examiner

POLYMERIC FOAM COMPRISING LOW LEVELS OF BROMINATED FLAME RETARDANT AND METHOD OF MAKING SAME

RELATED APPLICATIONS

The present application claims priority to and any other benefit of U.S. Provisional Patent Application No. 62/334,511, titled "POLYMERIC FOAM COMPRISING LOW LEVELS OF BROMINATED FLAME RETARDANT AND METHOD OF MAKING SAME," filed on May 11, 2016, the entire disclosure of which is incorporated herein by reference in its entirety.

BACKGROUND

Flame retardant agents are typically added to flammable and combustible materials to reduce or prevent damage due to fire. Flame retardant agents are particularly important in combustible materials used for building and construction, insulation, soft furnishings, clothing, etc., due to the serious risks of damage, injury, and death that fire presents to people, animals, and property.

One class of flame retardant agents commonly used in polymeric materials includes non-polymeric brominated compounds, such as hexabromocyclododecane (HBCD). There is general interest in reducing the amount of bromine used in flame retardant compositions and in the combustible materials treated with flame retardant compositions.

SUMMARY

Various exemplary embodiments of the present invention are directed to a composition and method for making polymeric foam. The polymeric foam includes a flame retardant composition comprising at least one brominated polymeric compound. The flame retardant composition may comprise one or more flame retardant components. The resulting polymeric foam has a reduced bromine content while maintaining acceptable flame retardant properties. In some exemplary embodiments, the flame retardant composition comprises a stabilizer. In some exemplary embodiments, the flame retardant composition comprises a synergist.

In some exemplary embodiments, a foamable polymeric mixture is disclosed. The foamable polymeric mixture comprises a polymer composition, a blowing agent composition, and a flame retardant comprising a brominated polymeric compound. The foamable polymeric mixture comprises from about 0.01-0.5 wt. % bromine.

In some exemplary embodiments, a method of manufacturing polymeric foam is disclosed. In some exemplary embodiments, the method of manufacturing the polymeric foam is by an extrusion process. The method includes introducing a polymer composition into a screw extruder to form a polymeric melt, and introducing a flame retardant composition comprising a brominated polymeric compound into the polymeric melt. A blowing agent is injected into the polymeric melt to form a foamable polymeric material, and the foamable polymeric material is extruded to form extruded polymeric foam. The extruded polymeric foam comprises from about 0.01-0.5 wt. % bromine.

In some exemplary embodiments, extruded polymer foam is disclosed. The extruded polymer foam comprises a polymeric material, a flame retardant composition comprising a brominated polymeric compound, and a blowing agent composition. The extruded polymer foam comprises from about 0.01-0.5 wt. % bromine.

In some exemplary embodiments, a method of manufacturing polymeric foam is disclosed. In some exemplary embodiments, the method of manufacturing the polymeric foam includes an expanded foam process. The expanded foam process includes introducing a monomer dispersed in a liquid phase into a reaction vessel. A flame retardant composition comprising a brominated polymeric compound and a blowing agent composition are also introduced into the reaction vessel. The monomer is polymerized to form a polymer. The polymer is expanded to form expanded polymeric foam. The expanded polymeric foam comprises from about 0.01-0.5 wt. % bromine.

In some exemplary embodiments, expanded polymer foam is disclosed. The expanded polymer foam comprises a polymeric material from a monomer polymerized to form a polymer, a flame retardant composition comprising a brominated polymeric compound, and a blowing agent composition. The expanded polymer foam comprises from about 0.01-0.5 wt. % bromine.

DETAILED DESCRIPTION OF THE DISCLOSURE

A polymeric foam composition, along with a method for making polymeric foam, is described in detail herein. The composition and method for making polymeric foam disclosed herein includes a flame retardant composition comprising a brominated polymeric compound. The resulting polymeric foam has reduced bromine content while maintaining acceptable flame retardant properties. In some exemplary embodiments, the flame retardant composition comprises a stabilizer. In some exemplary embodiments, the flame retardant composition comprises a synergist. These and other features of the polymeric foam, as well as some of the many optional variations and additions, are described in detail hereafter.

Unless defined otherwise, all technical and scientific terms used herein have the same meaning as commonly understood by one of ordinary skill in the art to which the invention belongs. Any methods and materials similar or equivalent to those described herein can be used in the practice or testing of the present invention. Any references cited herein, including published or corresponding U.S. or foreign patent applications, issued U.S. or foreign patents, or any other references, are each incorporated by reference in their entireties, including all data, tables, figures, and text presented in the cited references.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

As used herein, unless specified otherwise, the values of the constituents or components of the polymeric foam, the flame retardant composition, or other compositions are expressed in weight percent or % by weight of each ingredient in the composition. The values provided include up to and including the endpoints given. Unless otherwise specified, the terms "% by weight" and "wt. %" are used interchangeably and are meant to indicate a percentage based on 100% of the total weight of all ingredients excluding the weight or weight % of the blowing agent composition.

As used herein, "theoretical bromine content" refers to the calculated bromine content of the foamable polymeric mixture (i.e., the mixture prior to being foamed), in weight percent based on the total weight of the foamable polymeric mixture, excluding the weight of the blowing agent composition. The theoretical bromine content is equal to the weight percent of brominated polymeric compound in the foamable polymeric composition multiplied by the bromine weight percent of the brominated polymeric compound.

As used herein, "actual bromine content" refers to the bromine content measured in the polymeric foam after the foam is manufactured. Actual bromine content can be measured by standard test methods known to those skilled in the art, such as X-ray fluorescence spectrometry (XRF).

The general inventive concepts herein relate to a polymeric foam composition and method for making a polymeric foam including a flame retardant composition comprising a brominated polymeric compound, wherein the polymeric foam has a reduced bromine content when compared to the bromine content of other known polymeric foams that include flame retardants, while still achieving acceptable flame retardant properties. In some exemplary embodiments, the flame retardant composition comprises a stabilizer. In some exemplary embodiments, the flame retardant composition comprises a synergist.

Matrix Polymer

The matrix polymer forms the bulk of the foamable polymeric mixture and provides strength, flexibility, toughness, and durability to the final product. The matrix polymer is not particularly limited, and generally, any polymer capable of being foamed may be used as the matrix polymer in the foamable polymeric mixture. The matrix polymer may be a thermoplastic or thermoset polymer. In some embodiments, the matrix polymer may comprise a single polymer. In some embodiments, the matrix polymer may comprise a blend of two or more polymers. In some embodiments, the matrix polymer may be selected to provide sufficient mechanical strength to the final polymeric foamed product. In some embodiments, the matrix polymer may be selected to be compatible with the process utilized to form final polymeric foam product. In some embodiments, the matrix polymer is chemically stable, that is, generally non-reactive, within the expected temperature range experienced by the matrix polymer during formation and subsequent use in a polymeric foam.

The matrix polymer may be present in the foamable polymeric mixture in an amount from at least about 50 wt. % (based on the total weight of all ingredients excluding the blowing agent composition), in an amount from about 60 wt. % to about 100 wt. %, in an amount from about 70 wt. % to about 99 wt. %, in an amount from about 75 wt. % to about 98 wt. %, in an amount from about 80 wt. % to about 96 wt. %, or in an amount from about 85 wt. % to about 95 wt. %. In certain exemplary embodiments, the matrix polymer may be present in an amount from about 80 wt. % to about 100 wt. %.

As used herein, the term "polymer" is generic to the terms "homopolymer," "copolymer," "terpolymer," and combinations of homopolymers, copolymers, and/or terpolymers. Non-limiting examples of suitable foamable polymers include alkenyl aromatic polymers, styrenic polymers, polystyrene (PS), styrenic copolymers, styrenic block copolymers, copolymers of styrene and butadiene, styrene acrylonitrile (SAN), acrylonitrile butadiene styrene, acrylic/styrene/acrylonitrile block terpolymer (ASA), styrene maleic anhydride copolymer (SMA), styrene methyl methacrylate copolymer (SMMA), polyolefins, polyethylene (PE), polypropylene (PP), copolymers of ethylene and propylene, copolymers of vinyl acetate and ethylene, polyvinyl chloride (PVC), chlorinated polyvinyl chloride (CPVC), polycarbonates, polyisocyanurates, polyesters, polyethylene terephthalate (PET), polyacrylic acid esters, polymethylmethacrylate (PMMA), polyphenylene oxide, polyurethanes, phenolics, polysulfone, polyphenylene sulfide, acetal resins, polyamides, polyaramides, polyimides, polyetherimides, rubber modified polymers, thermoplastic polymer blends, and combinations thereof.

In some exemplary embodiments, the matrix polymer is an alkenyl aromatic polymer material. Suitable alkenyl aromatic polymer materials include alkenyl aromatic homopolymers and copolymers of alkenyl aromatic compounds and copolymerizable ethylenically unsaturated co-monomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer.

Examples of alkenyl aromatic polymers include, but are not limited to, those alkenyl aromatic polymers derived from alkenyl aromatic compounds such as styrene, styrene acrylonitrile (SAN) copolymers, alpha-methylstyrene, ethylstyrene, vinyl benzene, vinyl toluene, chlorostyrene, and bromostyrene. In at least one embodiment, the alkenyl aromatic polymer comprises polystyrene (PS).

In certain exemplary embodiments, minor amounts of monoethylenically unsaturated monomers such as C2 to C6 alkyl acids and esters, ionomeric derivatives, and C4 to C8 dienes may be copolymerized with alkenyl aromatic monomers to form the alkenyl aromatic polymer. Non-limiting examples of copolymerizable monomers include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate, and butadiene.

In certain exemplary embodiments, the matrix polymer may be formed entirely of polystyrene. In certain exemplary embodiments, the matrix polymer may be formed substantially of (e.g., greater than 95 wt. %) of polystyrene. In certain exemplary embodiments, the matrix polymer may be formed of from about 40-100 wt. % of polystyrene, including from about 45-99 wt. %, including from about 50-98 wt. %, including from about 55-97 wt. %, including from about 60-96 wt. %, including from about 65-95 wt. %, including from about 70-94 wt. %, including from about 75-93 wt. %, including from about 80-92 wt. %, including from about 85-91 wt. %, including from about 80-90 wt. % of polystyrene.

Flame Retardant Composition

The foamable polymeric mixture of the present invention further comprises a flame retardant composition comprising a brominated polymeric compound. The foamable polymeric mixture contains a suitable amount of the flame retardant composition such that the bromine content in the foamable polymeric mixture is from about 0.01-0.5 wt. %

(based upon the total weight of all ingredients excluding the blowing agent composition). In some exemplary embodiments, flame retardant compositions may be added in an extruded polymeric foam manufacturing process to impart flame retardant characteristics to the extruded polymeric foam. In some exemplary embodiments, flame retardant compositions may be added in an expanded polymeric foam manufacturing process to impart flame retardant characteristics to the expanded polymeric foam.

The flame retardant compositions comprising brominated polymeric compounds are alternatives to HBCD. Brominated polymeric compounds have been tested and found to be more sustainable than HBCD, because they are not bio-accumulative or toxic. HBCD has a molecular weight of 642 Da, whereas brominated polymeric compounds have higher molecular weights (i.e., greater than about 10 kDa). The higher molecular weight means that brominated polymeric compounds do not bio-accumulate if ingested, inhaled, or absorbed by humans or animals. The bromine content of HBCD is typically about 75 wt. % of the total weight of HBCD. In contrast, the brominated polymeric compounds used in the flame retardant compositions of the present invention typically have a bromine content of from about 60-66 wt. % of the total weight of the brominated polymeric compound. It can be envisioned that other brominated polymeric compounds suitable for use in flame retardant compositions may have a bromine content of equal to or less than about 70% of the total weight of the brominated polymeric compound.

It has traditionally been accepted that flame retardant compositions should be added to foamable polymeric mixture at loadings of about 1-5 wt. %. If the flame retardant composition was HBCD, with a bromine content of about 75 wt. %, a loading of 1-5 wt. % would result in a foamable polymeric mixture having theoretical bromine content of about 0.75-3.75 wt. %. Since brominated polymeric compounds have a lower bromine content than HBCD, it was commonly expected that these brominated polymeric compounds would require an even higher loading in foamable polymeric mixtures. However, the inventors have unexpectedly discovered that polymeric foams may be loaded with flame retardant compositions comprising polymeric brominated compounds at surprisingly lower levels, while still retaining acceptable flame retardant characteristics. This unexpected discovery results in polymeric foams with much lower bromine content. The resulting low-bromine polymeric foams have been found to meet the acceptance criteria of standard tests, such as the NFPA 286 room corner test, the UL 723 surface burning characteristics test, the ASTM D2863 limiting oxygen index test, and the ASTM E84 surface burning characteristics test.

In certain exemplary embodiments, the flame retardant compositions comprising brominated polymeric compounds are added to the foamable polymeric mixture at amounts from about 0.05-1.0 wt. % of the brominated polymeric compound, based on the total weight of the foamable polymeric mixture (excluding the weight of the blowing agent composition). In certain exemplary embodiments, the flame retardant compositions comprising brominated polymeric compounds are added to the foamable polymeric mixture at amounts from about 0.1-0.95 wt. %, including from about 0.15-0.9 wt. %, including from about 0.2-0.85 wt. %, including from about 0.25-0.8 wt. %, including from about 0.3-0.75 wt. %, including from about 0.35-0.7 wt. %, including from about 0.4-0.65 wt. %, including from about 0.45-0.6 wt. %, including from about 0.5-0.55 wt. %, including about 0.15 wt. %, including about 0.2 wt. %, including about 0.25 wt. %, including about 0.3 wt. %, including about 0.35 wt. %, including about 0.4 wt. %, including about 0.45 wt. %, including about 0.5 wt. %, including about 0.55 wt. %, including about 0.60 wt. %, including about 0.65 wt. %, including about 0.7 wt. %, including about 0.75 wt. %, including about 0.8 wt. %, including about 0.85 wt. %, including about 0.9 wt. %, including about 0.95 wt. %, and including about 1.0 wt. % of the brominated polymeric compound, based on the total weight of the foamable polymeric mixture (excluding the weight of the blowing agent composition). Assuming a bromine content of about 64 wt. % of the total weight of the brominated polymeric compounds, in certain exemplary embodiments, the foamable polymeric mixture will have a theoretical bromine content of about 0.03-0.64 wt. %, based on the total weight of the foamable polymeric mixture (excluding the weight of the blowing agent composition). In certain exemplary embodiments, the foamable polymeric mixture will have a theoretical bromine content of about 0.05-0.61 wt. %, including from about 0.1-0.58 wt. %, including from about 0.15-0.54 wt. %, including from about 0.18-0.51 wt. %, including from about 0.22-0.48 wt. %, including from about 0.26-0.45 wt. %, including from about 0.29-0.42 wt. %, including from about 0.32-0.38 wt. %, including about 0.1 wt. %, including about 0.13 wt. %, including about 0.16 wt. %, including about 0.19 wt. %, including about 0.22 wt. %, including about 0.25 wt. %, including about 0.26 wt. %, including about 0.29 wt. %, including about 0.32 wt. %, including about 0.35 wt. %, including about 0.37 wt. %, including about 0.4 wt. %, including about 0.43 wt. %, including about 0.45 wt. %, including about 0.5 wt. %, including about 0.55 wt. %, including about 0.6 wt. %, and including about 0.64 wt. %, based on the total weight of the foamable polymeric mixture.

In some embodiments, the brominated polymeric compounds comprise brominated polyolefinic polymers. In some embodiments, the brominated polymeric compounds comprise brominated polyethylene, brominated polypropylene, brominated polybutene, brominated polybutadiene, and copolymers thereof. In some embodiments, the brominated polymeric compounds comprise brominated block copolymers. In some embodiments, the brominated polymeric compounds comprise block copolymers of polystyrene and brominated polybutadiene. In some embodiments, the brominated polymeric compounds comprise high molecular weight block copolymers of polystyrene and brominated polybutadiene. Suitable brominated polymeric compounds include, but are not limited to, Emerald Innovation™ 3000 (Chemtura Corporation, Philadelphia, Pa., US), FR-122P (ICL Industrial Products, St. Louis, Mo., US), or Green-Crest™ Flame Retardant (Albemarle Corporation, Baton Rouge, La., US).

Flame Retardant Composition Stabilizers

The flame retardant composition of the present invention may further comprise one or more stabilizers. It is important to maintain the stability of flame retardant compositions comprising brominated polymeric compounds when the brominated polymeric compounds are exposed to heat, shear rate, contaminants (e.g., zinc or other metals), and other processing conditions.

For instance, it is important to maintain the thermal stability of flame retardant compositions comprising brominated polymeric compounds when a manufacturing process comprises high-temperature processing steps. A foamable polymeric mixture comprising a brominated polymeric compound may be exposed to high temperatures during a melt-blending and/or an extrusion process. Additionally, if the brominated polymeric compound in the flame retardant composition is pre-compounded into a masterbatch prior to being added to a foamable polymer mixture, the pre-compounding step may expose the brominated polymeric compound to additional high-temperature processing. The use of recycled materials in manufacturing polymeric foams also raises stability concerns, as the recycled materials are repeatedly exposed to high temperatures (and possible contaminants) during initial manufacturing processes as well as during the recycling process. The presence of zinc or other metals from recycled materials may have catalytic effect that increases the degradation of brominated flame retardant and reduces the brominated flame retardant's thermal stability.

When brominated polymeric compounds are exposed to high temperature, brominated polymeric compounds may experience some level of chemical breakdown. This breakdown may result in the loss of bromine and the release of hydrobromic acid (HBr). The loss of bromine during manufacture may negatively affect the flame retardant performance of the polymeric foam. The loss of bromine can also discolor the polymer foam, and in some embodiments, the discoloration may be severe. Chemical breakdown of brominated polymeric compounds may also result in the release of HBr, which can cause corrosion and damage to the processing equipment.

In certain exemplary embodiments, the flame retardant composition comprising a brominated polymeric compound also comprises at least one stabilizer. For the purpose of this disclosure, the term "stabilizer" includes, but is not limited to, antioxidants, thermal stabilizers, UV stabilizers, acid scavengers, and other stabilizers suitable for maintaining the physical and chemical stability of both the flame retardant composition (during manufacture, storage, and use of the flame retardant composition) and the polymeric foam incorporating the flame retardant composition. In certain exemplary embodiments, the flame retardant composition may comprise a mixture of stabilizers. These stabilizers may work independently, additively, or synergistically to protect and stabilize both the flame retardant composition comprising brominated polymeric compounds and the polymeric foam incorporating the flame retardant composition.

In some exemplary embodiments, the flame retardant composition may comprise stabilizers that are antioxidants. There are many types of antioxidants known by those skilled in the art. One class of common antioxidants is hindered phenolic antioxidants. Examples of hindered phenolic antioxidants include the Irganox® family of antioxidants (BASF, Florham Park, N.J., US) and the Anox® family of antioxidants (Addivant, Danbury, Conn., US). Another common class of antioxidants is organophosphite antioxidants. Examples of organophosphite antioxidants include the Irgofos® family of antioxidants (BASF, Florham Park, N.J., US) and the Ultranox® family of antioxidants (Addivant, Danbury, Conn., US). Another common class of antioxidants is aromatic amine antioxidants. Examples of aromatic amine antioxidants include the Naugard® family of antioxidants (Addivant, Danbury, Conn., US) and Agerite® Stalite® family of antioxidants (Vanderbilt Chemicals, LLC, Norwalk, Conn., US).

In some exemplary embodiments, the flame retardant composition may comprise stabilizers that are acid scavengers. One common class of acid scavengers is epoxy compounds, including but not limited to epoxy resins. These epoxy compounds may be based on a bisphenol compound, such as diglycidyl ethers of bisphenol A. The epoxy compounds may be epoxy novolac resins or epoxy cresol novolac resins. The epoxy compounds may be brominated. Examples of useful epoxy compounds include F-2200HM, F-2001HM, and F-3014 (ICL Industrial Products, St. Louis, Mo., US), EPON™ 164 and EPON™ 165 (Hexion, Inc., Columbus, Ohio, US), and the Araldite® ECN family of epoxy cresol novolac resins (Huntsman Advanced Materials, LLC, The Woodlands, Tex., US).

In certain exemplary embodiments, the flame retardant composition comprising a brominated polymeric compound also comprises at least one synergist. Synergists are components that may be added to brominated flame retardant compositions to assist in initiating the decomposition of the brominated polymeric compound in the flame retardant composition. Exemplary synergists include 2,3-dimethyl-2,3-diphenyl butane (also known as "biscumyl" or "dicumene"); poly(1,4-diisopropylbenzene); bis($\alpha$-phenylethyl) sulfone; 2,2'-dimethyl-2,2'-azobutane; 2,2'-dichloro-2,2'-azobutane; 2,2'-dibromo-2,2'-azobutane; $\alpha,\alpha'$-bis-t-butylperoxy-diisopropylenebenzene; dioctyl tin maleate; and dibutyl tin maleate.

In some exemplary embodiments of the present invention, the flame retardant composition comprising a brominated polymeric compound is pre-compounded with carrier resin to form a flame retardant masterbatch. The carrier resin may be selected from any polymer that is compatible with the masterbatch components and the foamable polymeric mixture. In certain exemplary embodiments, the carrier resin is selected from the group consisting of polystyrene, styrene-butadiene-styrene (SBS) copolymers and block copolymers, styrene acrylonitrile (SAN) copolymers, poly ($\alpha$-methylstyrene), polychlorostyrene, polybromostyrene, polyethylene, polypropylene, and combinations thereof.

In certain exemplary embodiments, the flame retardant masterbatch may comprise a brominated polymeric compound, an antioxidant, and a carrier resin. In certain exemplary embodiments, the flame retardant masterbatch may comprise a brominated polymeric compound, an antioxidant, an epoxy compound, and a carrier resin. In certain exemplary embodiments, the flame retardant masterbatch may comprise a brominated polymeric compound, an antioxidant, an epoxy compound, a synergist, and a carrier resin. In certain exemplary embodiments, the flame retardant masterbatch may comprise a brominated polymeric compound, more than one antioxidant, an epoxy compound, a synergist, and a carrier resin. In certain exemplary embodiments, the brominated polymeric compound may comprise from about 10-60 wt. % of the flame retardant masterbatch, including from about 20-55 wt. %, including from about 25-50 wt. %, including from about 30-45 wt. %, including about 40 wt. %, including about 45 wt. %, including about 50 wt. %, and including about 55 wt. %, of the total weight of the flame retardant masterbatch. In certain exemplary embodiments, the additives (i.e., antioxidant, epoxy compound, and/or synergist) may comprise from about 0.5-20 wt. % of the flame retardant masterbatch, including from about 1-18 wt. %, including from about 1-15 wt. %, including from about 2-13 wt. %, including from about 3-12 wt. %, including from about 5-11 wt. %, including from about 7-10 wt. %, including about 5 wt. %, including about 7 wt. %, including about 8 wt. %, including about 9 wt. %, including about 9.5 wt. %, including about 10 wt. %, including about 10.5 wt. %, including about 11 wt. %, including about 11.5 wt. %, including about 12 wt. %, including about 13 wt. %, including about 14 wt. %, and including about 15 wt. %, of the total weight of the flame retardant masterbatch.

Additional Polymeric Foam Additives

In certain exemplary embodiments, the polymeric foam comprises at least one stabilizer including, but not limited to, antioxidants, thermal stabilizers, UV stabilizers, acid scavengers, and other stabilizers suitable for maintaining the physical and chemical stability the polymeric foam incorporating the flame retardant composition. In certain exemplary embodiments, the polymeric foam may comprise a mixture of stabilizers. In certain exemplary embodiments, the at least one stabilizer in the polymeric foam may be in addition to a stabilizer in the flame retardant composition. In certain exemplary embodiments, the at least one stabilizer in the polymeric foam is the same as a stabilizer in the flame retardant composition. In certain exemplary embodiments, the at least one stabilizer in the polymeric foam is different from a stabilizer in the flame retardant composition.

In certain exemplary embodiments, the polymeric foam comprises at least one synergist. Synergists may be added to polymeric foams containing flame retardant compositions comprising a brominated polymeric compound. The synergist may assist in initiating the decomposition of the brominated polymeric compound and thereby enhancing the flame retardant properties of the brominated polymeric compound. In certain exemplary embodiments, the at least one synergist in the polymeric foam may be in addition to a synergist in the flame retardant composition. In certain exemplary embodiments, the at least one synergist in the polymeric foam is the same as a synergist in the flame retardant composition. In certain exemplary embodiments, the at least one synergist in the polymeric foam is different from a synergist in the flame retardant composition.

The polymeric foam may optionally include additional additives, such as nucleating agents, plasticizing agents, pigments, elastomers, processing agents, extrusion aids, fillers, antistatic agents, biocides, termite-ocides, colorants, oils, or waxes, may be incorporated into the polymeric foam. These optional additives may be included in amounts necessary to obtain desired characteristics of the foamable polymeric mixture or resultant polymeric foam. The additives may be added to the foamable polymer mixture, or they may be incorporated before, during, or after the polymerization process used to make the matrix polymer.

Blowing Agents

Exemplary embodiments of the present invention utilize a blowing agent composition. Any blowing agent may be used in accordance with the present invention. According to one aspect of the present invention, the blowing agent or co-blowing agents are selected based on the considerations of low global warming potential, low thermal conductivity, non-flammability, high solubility in the matrix polymer, high blowing power, low cost, and the overall safety of the blowing agent composition.

Due to environmental concerns about halogenated hydrocarbons, including halogenated blowing agents, non-halogenated blowing agents or co-blowing agents are desirable. In some exemplary embodiments, the blowing agent or co-blowing agents comprise carbon dioxide. In some exemplary embodiments, carbon dioxide may comprise the sole blowing agent. In some exemplary embodiments, the blowing agent composition comprises both carbon dioxide and one or more of a variety of co-blowing agents to achieve the desired polymeric foam properties in the final product. In some exemplary embodiments, the blowing agent composition comprises carbon dioxide and water. In some exemplary embodiments, the blowing agent composition comprises carbon dioxide and a hydrocarbon such as pentane. In some exemplary embodiments, the blowing agent composition comprises carbon dioxide and methanol. In some exemplary embodiments, the blowing agent composition comprises carbon dioxide and ethanol. In some exemplary embodiments, the blowing agent composition comprises carbon dioxide and methyl formate. In some exemplary embodiments, the blowing agent composition comprises carbon dioxide and halogenated blowing agents. However, in other exemplary embodiments, blowing agent compositions that do not include carbon dioxide may be used.

In some exemplary embodiments, the blowing agents or co-blowing agents of the blowing composition may comprise hydrocarbon gases and liquids. In some exemplary embodiments, the blowing agents or co-blowing agents of the blowing composition may comprise liquids, such as alkyl esters (e.g., methyl formate), water, alcohols (e.g., ethanol), acetone, and mixtures thereof.

The hydrocarbon blowing agent or co-blowing agents may include, for example, propane, butanes, pentanes, hexanes, and heptanes. In some exemplary embodiments, the hydrocarbon blowing agents or co-blowing agents include butanes, pentanes, heptanes, and combinations thereof. Butane blowing agents include, for example, n-butane and isobutane. Pentane blowing agents include, for example, n-pentane, isopentane, neopentane, and cyclopentane. Heptane blowing agents include, for example, n-heptane, isoheptane, 3-methylhexane, 2,2-dimethylpentane, 2,3-dimethylpentane, 2,4-dimethylpentane, 3,3-dimethylpentane, 3-ethylpentane, and 2,2,3-trimethylbutane.

In some exemplary embodiments, the blowing agent or co-blowing agents of the blowing agent composition may comprise one or more halogenated blowing agents, such as hydrofluorocarbons (HFCs), hydrochlorofluorocarbons, hydrofluoroethers, hydrofluoroolefins (HFOs), hydrochlorofluoroolefins (HCFOs), hydrobromofluoroolefins, hydrofluoroketones, hydrochloroolefins, and fluoroiodocarbons.

The hydrofluoroolefin blowing agent or co-blowing agents may include, for example, 3,3,3-trifluoropropene (HFO-1243zf); 2,3,3-trifluoropropene; (cis and/or trans)-1,3,3,3-tetrafluoropropene (HFO-1234ze), particularly the trans isomer; 1,1,3,3-tetrafluoropropene; 2,3,3,3-tetrafluoropropene (HFO-1234yf); (cis and/or trans)-1,2,3,3,3-pentafluoropropene (HFO-1225ye); 1,1,3,3,3-pentafluoropropene (HFO-1225zc); 1,1,2,3,3-pentafluoropropene (HFO-1225yc); hexafluoropropene (HFO-1216); 2-fluoropropene, 1-fluoropropene; 1,1-difluoropropene; 3,3-difluoropropene; 4,4,4-trifluoro-1-butene; 2,4,4,4-tetrafluorobutene-1; 3,4,4,4-tetrafluoro-1-butene; octafluoro-2-pentene (HFO-1438); 1,1,3,3,3-pentafluoro-2-methyl-1-propene; octafluoro-1-butene; 2,3,3,4,4,4-hexafluoro-1-butene; 1,1,1,4,4,4-hexafluoro-2-butene (HFO-1336m/z); 1,2-difluoroethene (HFO-1132); 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-I-butene; 3,3-difluoro-I-butene; 3,4,4-trifluoro-I-butene; 2,3,3-trifluoro-1-butene; I, 1,3,3-tetrafluoro-I-butene; 1,4,4,4-tetrafluoro-1-butene; 3,3,4,4-tetrafluoro-1-butene; 4,4-difluoro-1-butene; I, I, 1-trifluoro-2-butene; 2,4,4,4-tetrafluoro-1-butene; 1,1,1,2-tetrafluoro-2 butene; 1,1,4,4,4-pentafluorol-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene. In some exemplary embodiments, the blowing agent or co-blowing agents include HFO-1234ze.

The blowing agent or co-blowing agents may also include one or more hydrochlorofluoroolefins (HCFO), hydrochlorofluorocarbons (HCFCs), or hydrofluorocarbons (HFCs), such as HCFO-1233; 1-chloro-1,2,2,2-tetrafluoroethane (HCFC-124); 1,1-dichloro-1-fluoroethane (HCFC-141b); 1, 1, 1, 2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); and dichlorofluoromethane (HCFC-22).

The term "HCFO-1233" is used herein to refer to all trifluoromonochloropropenes. Among the trifluoromonochloropropenes are included both cis- and trans-1,1,1-trifluoro-3-chloropropene (HCFO-1233zd or 1233zd). The term "HCFO-1233zd" or "1233zd" is used herein generically to refer to 1,1,1-trifluoro-3-chloro-propene, whether it is the cis- or trans-form. The terms "cis HCFO-1233zd" and "trans HCFO-1233zd" are used herein to describe the cis- and trans-forms of 1,1,1-trifluoro-3-chloropropene, respectively. The term "HCFO-1233zd" therefore includes within its scope cis HCFO-1233zd (also referred to as 1233zd(Z)), trans HCFO-1233zd (also referred to as 1233(E)), and all combinations and mixtures of these.

In some exemplary embodiments, the blowing agent or co-blowing agents may comprise one or more hydrofluorocarbons. The specific hydrofluorocarbon utilized is not particularly limited. A non-exhaustive list of examples of suitable HFC blowing agents or co-blowing agents include 1,1-difluoroethane (HFC-152a), 1,1,1,2-tetrafluoroethane (HFC-134a), 1,1,2,2-tetrafluoroethane (HFC-134), 1,1,1-trifluoroethane (HFC-143a), difluoromethane (HFC-32), 1,3,3,3-pentafluoropropane (HFO-1234ze), pentafluoro-ethane (HFC-125), fluoroethane (HFC-161), 1,1,2,2,3,3-hexafluoropropane (HFC 236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245ca), 1,1,2,3,3-pentafluoropropane (HFC-245ea), 1,1,1,2,3-pentafluoropropane (HFC-245eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof.

In some exemplary embodiments, the blowing agent or co-blowing agents are selected from hydrofluoroolefins, hydrofluorocarbons, and mixtures thereof. In some exemplary embodiments, the blowing agent composition comprises carbon dioxide and the co-blowing agent HFC-134a. In some exemplary embodiments, the blowing agent composition comprises carbon dioxide and HFO-1234ze. The co-blowing agents identified herein may be used singly or in combination.

In some exemplary embodiments, the total blowing agent composition is present in an amount from about 1% to about 15% by weight, and in exemplary embodiments, from about 2% to about 10% by weight, or from about 3% to about 9% by weight (based upon the total weight of all ingredients excluding the blowing agent composition).

In some exemplary embodiments, the blowing agent composition may be introduced in liquid or gaseous form (e.g., a physical blowing agent). In some exemplary embodiments, the blowing agent composition may be generated in situ while producing the foam (e.g., a chemical blowing agent). In some exemplary embodiments, the blowing agent may be formed by decomposition of another constituent during production of the foamed thermoplastic. For example, a carbonate composition, polycarbonic acid, sodium bicarbonate, or azodicarbonamide and others that decompose and/or degrade to form $CO_2$, $N_2$, and $H_2O$ upon heating may be added to the foamable resin and foaming gas (e.g., $CO_2$ or $N_2$) will be generated upon heating during the extrusion process.

Method of Manufacture

In some embodiments, the polymeric foams of the present disclosure are extruded polymeric foams made by an extrusion method. The extrusion apparatus may comprise a single or twin screw extruder including a barrel surrounding a screw on which a spiral flight is provided, configured to compress and heat material introduced into the screw extruder. The matrix polymer and other components of the foamable polymer mixture may be fed into the screw extruder as a flowable solid, such as beads, granules, or pellets, or as a liquid or semi-liquid melt, from one or more feed hoppers. The flame retardant composition and, optionally, one or more other additives may be fed into the screw extruder with the matrix polymer, or these additives may be added through a separate port configured to inject the additives through the barrel into the polymer mixture in the screw extruder. As the polymer mixture advances through the screw extruder, the decreasing spacing of the flight defines a successively smaller space through which the polymer mixture is forced by the rotation of the screw. This decreasing volume acts to increase the pressure of the polymer mixture to obtain a polymer melt (if solid starting materials were used) or to increase the pressure of the polymer melt. One or more additional ports may be provided through the barrel for injecting one or more blowing agents into the molten polymer mixture. In some exemplary embodiments, the resulting molten polymer mixture is subjected to additional blending sufficient to distribute each of the additives generally uniformly throughout the molten polymer mixture to obtain a foamable polymeric mixture.

This foamable polymeric mixture is then forced through an extrusion die, and exits the die into a region of reduced pressure (which may be below atmospheric pressure), thereby allowing the blowing agent to expand and produce a polymeric foam. The pressure reduction may be obtained gradually as the foamable polymeric mixture advances through successively larger openings provided in the die or through some suitable apparatus provided downstream of the extrusion die for controlling to some degree the manner in which the pressure applied to the foamable polymeric mixture is reduced. Once the polymeric foam has been formed, the polymeric foam may be subjected to additional processing such as calendaring, water immersion, cooling sprays, or other operations to control the thickness and other properties of the resulting polymeric foam product.

In some embodiments, the polymeric foams of the present disclosure are extruded polymeric beads made by a bead extrusion method. Bead extrusion is similar to the extrusion process previously described. However, the extrusion die contains a plurality of small holes such that the foamable polymeric mixture is extruded as beads. These beads are typically in the range of about 0.05 mm to about 2.0 mm in diameter. Furthermore, the foamable polymeric mixture is not allowed to foam once the beads exit the extrusion die. Instead, the beads containing the foamable polymeric mixture are discharged into a coolant chamber or coolant bath, and the beads are rapidly cooled to below the glass transition temperature ($T_g$) of the foamable polymeric mixture. This rapid cooling prevents the foamable polymeric mixture in the beads from foaming. The beads may be foamed later through conventional processes, such as a heating process.

In some exemplary embodiments of bead extrusion, the matrix polymer, flame retardant composition, blowing agents, and optional additives are introduced to the extruder as described above to form a foamable polymeric mixture. In some exemplary embodiment of bead extrusion, the matrix polymer, flame retardant composition, and optional additives are introduced to the extruder as described above to form a polymeric mixture, but the blowing agent is added to the extruded beads via a pressure vessel after the beads have been extruded and cooled.

In some embodiments, the polymeric foams of the present disclosure are expanded polymeric foams made by an emulsion or suspension polymerization method. In exemplary embodiments of expanded polymeric foams, the matrix polymer is polymerized from monomer dispersed in a liquid phase within a reaction vessel. The flame retardant composition and other optional additives are also added to the liquid phase within the reaction vessel. In some embodiments, the monomers of the matrix polymer, the flame retardant composition, and other optional additives are dispersed within the liquid phase within the reaction vessel at about the same time. In some embodiments, monomer of the matrix polymer is dispersed within the liquid phase within the reaction vessel and the polymerization reaction to form the matrix polymer occurs before the flame retardant composition and other optional additives are dispersed within the liquid phase within the reaction vessel. In some embodiments, one or more blowing agents are added to the polymeric mixture by adding the blowing agent(s) as diluents within the liquid phase within the reaction vessel during the polymerization reaction. In some embodiments, one or more blowing agents are used as the liquid phase within the reaction vessel during the polymerization reaction. In some embodiments, one or more blowing agents are added to the polymeric mixture in a pressure vessel after the polymerization reaction has been completed.

Polymer Foam

The manufacturing process produces a polymer foam. In some exemplary embodiments, the manufacturing process of the foamable polymeric mixture produces rigid, substantially closed cell, polymer foam boards prepared by an extruding process. Extruded foams have a cellular structure with cells defined by cell membranes and struts. Struts are formed at the intersection of the cell membranes, with the cell membranes covering interconnecting cellular windows between the struts. In some exemplary embodiments, the foams have an average density of less than 10 pounds per cubic foot ("pcf"), or less than 5 pcf, or less than 3 pcf. In some exemplary embodiments, the polymeric foam has a density from about 1 pcf to about 4.5 pcf. In some exemplary embodiments, the polymeric foam has a density from about 1.2 pcf to about 4 pcf. In some exemplary embodiments, the polymeric foam has a density from about 1.3 pcf to about 3.5 pcf. In some exemplary embodiments, the polymeric foam has a density from about 1.4 pcf to about 3 pcf. In some exemplary embodiments, the polymeric foam has a density from about 1.5 pcf to about 2.5 pcf. In some exemplary embodiments, the polymeric foam has a density from about 1.75 pcf to about 2.25 pcf. In some exemplary embodiments, the polymeric foam has a density of about 1.5 pcf, or lower than 1.5 pcf.

It is to be appreciated that the phrase "substantially closed cell" is meant to indicate that the foam contains all closed cells or nearly all of the cells in the cellular structure are closed. In most exemplary embodiments, not more than 30% of the cells are open cells, and particularly, not more than 10%, or more than 5% are open cells, or otherwise "non-closed" cells, as measured by standard test methods (e.g., ASTM D6226, "Standard Test Method for Open Cell Content of Rigid Cellular Plastics"). In some exemplary embodiments, from about 1.10% to about 2.85% of the cells are open cells. The closed cell structure helps to increase the R-value of a formed, foamed insulation product. It is to be appreciated, however, that it is within the purview of the present invention to produce an open cell structure.

Additionally, the inventive foamable polymeric mixture produces extruded foams that have insulation values (R-values) per inch of at least 4, or from about 4 to about 7, as measured by standard test methods (e.g., ASTM C518). In addition, the average cell size of the inventive foamable polymeric mixture and polymeric foam may be from about 0.05 mm (50 microns) to 0.4 mm (400 microns), in some exemplary embodiments from 0.1 mm (100 microns) to 0.3 mm (300 microns), and in some exemplary embodiments from 0.11 mm (110 microns) to 0.25 mm (250 microns). The polymeric foam may be formed into an insulation product such as a rigid insulation board, insulation foam, packaging product, and building insulation or underground insulation (for example, highway, airport runway, railway, and underground utility insulation).

The inventive foamable polymeric mixture additionally may produce polymeric foams that have a high compressive strength, as measured by standard test methods (e.g., ASTM D1621). Compressive strength defines the capacity of a foam material to withstand axially directed pushing forces. In some exemplary embodiments, the polymeric foams have a compressive strength between about 6 and 120 psi. In some exemplary embodiments, the inventive foamable polymeric mixture produces polymeric foam having a compressive strength between about 10 and about 110 psi.

In some exemplary embodiments, the inventive polymeric foams possess a high level of dimensional stability, as measured by standard test methods (e.g., ASTM D2126). In some exemplary embodiments, the change in dimension in any direction is 5% or less. In addition, the cells of the foam formed by the inventive foamable polymeric mixture are desirably monomodal, with a relatively uniform average cell size. As used herein, the average cell size is an average of the cell sizes as determined in the X, Y, and Z directions. For extruded foams, the "X" direction is the direction of extrusion, the "Y" direction is the cross machine direction, and the "Z" direction is the thickness. In the present invention, the highest impact in cell enlargement is in the X and Y directions, which is desirable from an orientation and R-value perspective. In addition, further process modifications would permit increasing the Z-orientation to improve mechanical properties while still achieving an acceptable thermal property. The inventive polymeric foam can be used to make insulation products such as rigid insulation boards, insulation foam, and packaging products.

EXAMPLES

The inventive concepts have been described above both generally and with regard to various exemplary embodiments. Although the general inventive concepts have been set forth in what is believed to be exemplary illustrative embodiments, a wide variety of alternatives known to those of skill in the art can be selected within the generic disclosure. Additionally, following examples are meant to better illustrate the present invention, but do in no way limit the general inventive concepts of the present invention.

Example 1

A polymeric flame retardant masterbatch (PFRM-1) was prepared containing Emerald™ 3000 brominated polymeric compound (Chemtura Corporation, Philadelphia, Pa., US). The PFRM-1 comprised about 40 wt. % Emerald™ 3000 brominated polymeric compound, and about 60 wt. % polystyrene with additives (e.g., stabilizer and synergist). Emerald™ 3000 has a bromine content of about 64 wt. %

Example 2

A sample of extruded polystyrene ("XPS") foam of the present invention (Sample A) was prepared using a twin screw extruder. Polystyrene was melted in the extruder, and the PFRM-1 masterbatch was added in a sufficient amount to yield 1.0 wt. % of the brominated polymeric compound in the foamable polystyrene mixture. Since the brominated polymeric compound had a bromine content of about 64 wt. %, the foamable polystyrene mixture of Sample A had a theoretical bromine content of about 0.6 wt. %. Blowing agent was injected into the polystyrene mixture to form a foamable polymeric mixture. The foamable polymeric mixture was then cooled to the desired foaming conditions, and the foamable polymeric mixture was extruded to form XPS foam sheets that were 1.5 inches in thickness.

A comparative control sample (Control 1) of XPS foams was also prepared as described above, except HBCD flame retardant was used instead of the PFRM-1 masterbatch. The HBCD flame retardant was added in a sufficient amount to yield 0.8 wt. % HBCD in the foamable polystyrene mixture. Since HBCD has a bromine content of about 75 wt. %, the foamable polystyrene mixture of Control 1 had a theoretical bromine content of about 0.6 wt. %

The XPS foams Sample A and Control 1 were evaluated using test method NFPA 286, "Standard Methods of Fire Tests for Evaluating Contribution of Wall and Ceiling Interior Finish to Room Fire Growth." The peak heat release rate (Peak HRR) and total smoke generated during the test were measured. The samples were also evaluated using test method ASTM D2863, "Standard Test Method for Measuring the Minimum Oxygen Concentration to Support Candle-like Combustion of Plastics (Oxygen Index)." Test results for Example 2 are shown in Table 1.

TABLE 1

| | | | NFPA 286 | |
| --- | --- | --- | --- | --- |
| Sample ID | FR added (wt. %) | Theoretical Bromine (wt. %) | Peak HRR (kW) | Total Smoke (m$^2$) | ASTM D2863 Oxygen Index (vol. %) |
| A | 1.0* | 0.6 | 240 | 288 | 25 |
| Control 1 | 0.8# | 0.6 | 217 | 364 | 26 |

*The flame retardant used in Sample A was Emerald ™ 3000 brominated polymeric compound.
The flame retardant used in Control 1 was HBCD.

Acceptance criteria for NFPA 286 (Annex C, 2015 edition) state that the peak HRR should not exceed 800 kW during the test, and the total smoke should not exceed 1,000 m$^2$. The test results in Table 1 show that Sample A, containing 1 wt. % brominated polymeric compound as flame retardant, has results that are comparable to the Control 1 sample, which contains 0.8 wt. % HBCD. Both Sample A and Control 1 have a theoretical bromine content of about 0.6 wt. %. Both Sample A and Control 1 pass the acceptance criteria for the NFPA 286 test. The ASTM D2863 Oxygen Index values were comparable for both samples, and met the minimum oxygen index value of 24% to comply with ASTM C578, "Standard Specification for Rigid, Cellular Polystyrene Thermal Insulation."

Example 3

Four samples of XPS foams were prepared using a twin screw extruder. Polystyrene was melted in the extruder, and varying amounts of the PFRM-1 masterbatch were added to the extruder. Blowing agent was injected into each foamable polystyrene mixture to form foamable polymeric mixtures. The foamable polymeric mixtures were then cooled to the desired foaming conditions, and the foamable polymeric mixtures were extruded to form XPS foam sheets that were 2.0 inches in thickness.

The XPS foam samples were analyzed for actual bromine content by X-ray fluorescence spectrometry (XRF). For this test, each foam sample was melted at 260° C. for 8 minutes in an XRF sample cup, and then analyzed for bromine content. One foam sample (C) had portions analyzed from different areas of the foam sample, to confirm the homogeneity of the bromine content in this XPS foam. The results are shown in Table 2.

TABLE 2

| Sample ID | Masterbatch Added (wt. %) | Emerald ™ 3000 Added (wt. %) | Actual Bromine (wt. %) |
| --- | --- | --- | --- |
| B | 1.0 | 0.40 | 0.15 |
| C | 0.7 | 0.28 | 0.10 |
| D | 0.5 | 0.20 | 0.07 |

Example 4

The four XPS samples from Example 3 were evaluated using test method NFPA 286, "Standard Methods of Fire Tests for Evaluating Contribution of Wall and Ceiling Interior Finish to Room Fire Growth." The peak heat release rate (Peak HRR) and total smoke generated during the tests were measured. The samples were also evaluated using test method ASTM D2863, "Standard Test Method for Measuring the Minimum Oxygen Concentration to Support Candle-like Combustion of Plastics (Oxygen Index)." Test results for Example 4 are shown in Table 3.

TABLE 3

| | | | NFPA 286 | |
| --- | --- | --- | --- | --- |
| Sample ID | FR added (wt. %) | Actual Bromine (wt. %) | Peak HRR (kW) | Total Smoke (m$^2$) | ASTM D2863 Oxygen Index (vol. %) |
| B | 0.40 | 0.15 | 320 | 465 | 26 |
| C | 0.28 | 0.10 | 426 | 568 | 25 |
| D | 0.20 | 0.07 | 370 | 462 | 24 |

Acceptance criteria for NFPA 286 (Annex C, 2015 edition) state that the peak HRR should not exceed 800 kW during the test, and the total smoke should not exceed 1,000 m$^2$. The test results in Table 3 show that Samples B, C, and D, containing from 0.2 wt. % to 0.4 wt. % brominated polymeric compound, pass the acceptance criteria for the NFPA 286 test. The ASTM D2863 Oxygen Index values were comparable for all three samples, and met the minimum oxygen index value of 24% to comply with ASTM C578, "Standard Specification for Rigid, Cellular Polystyrene Thermal Insulation."

Example 5

A second polymeric flame retardant masterbatch (PFRM-2) was prepared as described above for Example 1. The PFRM-2 comprised about 40 wt. % Emerald™ 3000 brominated polymeric compound and about 60 wt. % polystyrene with additives (e.g., stabilizer) but no synergist. Emerald™ 3000 has a bromine content of about 64 wt. %.

Four samples of XPS foams were prepared using a twin screw extruder. For two samples, polystyrene was melted in the extruder, and varying amounts of the PFRM-1 masterbatch containing synergist (from Example 1) were added to the extruder. For two other samples, polystyrene was melted in the extruder, and varying amounts of the PFRM-2 masterbatch without synergist (from Example 5) were added to the extruder. Blowing agent was injected into each foamable polystyrene mixture to form foamable polymeric mixtures. The foamable polymeric mixtures were then cooled to the desired foaming conditions, and the foamable polymeric mixtures were extruded to form XPS foam sheets that were 1.0 inches in thickness.

The four XPS samples from Example 5 were evaluated using test method NFPA 286, "Standard Methods of Fire Tests for Evaluating Contribution of Wall and Ceiling Interior Finish to Room Fire Growth." The peak heat release rate (Peak HRR) and total smoke generated during the tests were measured. The samples were also evaluated using test method ASTM D2863, "Standard Test Method for Measuring the Minimum Oxygen Concentration to Support Candle-like Combustion of Plastics (Oxygen Index)." Test results for Example 5 are shown in Table 4.

TABLE 4

| Sample ID | FR added (wt. %) | Theoretical Bromine (wt. %) | Synergist | NFPA 286 Peak HRR (kW) | NFPA 286 Total Smoke ($m^2$) | ASTM D2863 Oxygen Index (vol. %) |
|---|---|---|---|---|---|---|
| F | 0.25 | 0.16 | Yes | 252 | 262 | 25 |
| G | 0.50 | 0.32 | Yes | 248 | 210 | 26 |
| H | 0.25 | 0.16 | No | 238 | 282 | 25 |
| I | 0.50 | 0.32 | No | 254 | 214 | 26 |

Acceptance criteria for NFPA 286 (Annex C, 2015 edition) state that the peak HRR should not exceed 800 kW during the test, and the total smoke should not exceed 1,000 $m^2$. The test results in Table 4 show that Samples F, G, H, and I, containing from 0.25 wt. % to 0.50 wt. % brominated polymeric compound as flame retardant, pass the acceptance criteria for the NFPA 286 test. The NFPA 286 test results were comparable for the samples with and without synergist in the composition. The ASTM D2863 Oxygen Index values were also comparable for all four samples, and met the minimum oxygen index value of 24% to comply with ASTM C578, "Standard Specification for Rigid, Cellular Polystyrene Thermal Insulation."

As used in the description of the invention and the appended claims, the singular forms "a," "an," and "the" are intended to include the plural forms as well, unless the context clearly indicates otherwise. To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative process, and illustrative examples shown and described. Accordingly, departures may be made from such details without departing from the spirit or scope of the applicant's general disclosure herein.

What is claimed is:

1. A foamable polymeric mixture comprising:
   a polymer composition;
   a single blowing agent composition, wherein the single blowing agent composition consists of hydrocarbons, hydrofluoroolefins, hydrofluorocarbons, or mixtures thereof; and
   a flame retardant composition comprising a brominated polymeric compound, at least one of a synergist or a stabilizer, and a carrier resin, wherein the brominated polymeric compound comprises from 0.05 wt. % to 0.35 wt.% of the foamable polymeric mixture excluding the single blowing agent composition;
   wherein the foamable polymeric mixture comprises from 0.01 wt. % to 0.21 wt. % bromine,
   wherein the foamable polymeric mixture is devoid of additional blowing agents, and
   wherein the foamable polymeric mixture is capable of producing an extruded polymeric foam with a density from 1.0 pcf to less than 2.5 pcf.

2. The foamable polymeric mixture of claim 1, wherein the brominated polymeric compound comprises a block copolymer of polystyrene and brominated polybutadiene, wherein the brominated polymeric compound has a bromine content less than 70 wt. %.

3. The foamable polymeric mixture of claim 1, wherein the flame retardant composition comprises at least one stabilizer selected from the group consisting of a phenolic antioxidant, an organophosphite antioxidant, an aromatic amine antioxidant, an epoxy stabilizer, a brominated epoxy stabilizer, and combinations thereof.

4. The foamable polymeric mixture of claim 1, wherein the flame retardant composition comprises a synergist selected from the group consisting of 2,3-dimethyl-2,3-diphenyl butane, poly(1,4-diisopropylbenzene), bis(α-phenylethyl)sulfone, 2,2'-dimethyl-2,2'-azobutane, 2,2'-dichloro-2,2'-azobutane, 2,2'-dibromo-2,2'-azobutane, α,α'-bis-t-butylperoxy-diisopropylenebenzene, and combinations thereof.

5. The foamable polymer mixture of claim 1, wherein the polymer composition comprises polystyrene, polyethylene, polyethylene terephthalate (PET), styrene acrylonitrile (SAN) copolymer, or combinations thereof.

6. A polymeric foam made from the foamable polymeric mixture of claim 1.

7. An extruded polymeric foam comprising:
   a foamable polymeric material, the material comprising:
      a polymer composition;
      a flame retardant composition comprising a brominated polymeric compound, at least one of a synergist or a stabilizer, and a carrier resin; and a single blowing agent composition, wherein the single blowing agent composition consists of hydrocarbons, hydrofluoroolefins, hydrofluorocarbons, or mixtures thereof;

wherein the foamable polymeric material is devoid of additional blowing agents, wherein the brominated polymeric compound comprises from 0.05 wt. % to 0.35 wt. % of the foamable polymeric material excluding the single blowing agent composition, and wherein the extruded polymeric foam comprises from 0.01 wt. % to 0.21 wt. % bromine, and wherein the extruded polymeric foam has a density from 1.0 pcf to less than 2.5 pcf.

8. The extruded polymeric foam of claim 7, wherein the polymer composition comprises polystyrene, polyethylene, polyethylene terephthalate (PET), styrene acrylonitrile (SAN) copolymer, or combinations thereof.

9. The extruded polymeric foam of claim 7, wherein the brominated polymeric compound comprising a block copolymer of polystyrene and brominated polybutadiene, wherein the brominated polymeric compound has a bromine content less than 70 wt. %.

10. The extruded polymeric foam of claim 7, wherein the flame retardant composition comprises at least one stabilizer selected from the group consisting of a phenolic antioxidant, an organophosphite antioxidant, an aromatic amine antioxidant, an epoxy stabilizer, a brominated epoxy stabilizer, and combinations thereof.

11. The extruded polymeric foam of claim 7, wherein the flame retardant composition comprises a synergist selected from the group consisting of 2,3-dimethyl-2,3-diphenyl butane, poly(1,4-diisopropylbenzene), bis(α-phenylethyl) sulfone, 2,2'-dimethyl-2,2'-azobutane, 2,2'-dichloro-2,2'-azobutane, 2,2'-dibromo-2,2'-azobutane, α,α'-bis-t-butylperoxy-diisopropylenebenzene, and combinations thereof.

12. A method of manufacturing the extruded polymeric foam of claim 7, the method comprising:

introducing the polymer composition into a screw extruder to form a polymeric melt;

introducing the flame retardant composition comprising a brominated polymeric compound into the polymeric melt;

injecting the single blowing agent into the polymeric melt to form the foamable polymeric material; and extruding the foamable polymeric material to form the extruded polymeric foam.

13. The extruded polymeric foam of claim 7, further comprising a nucleating agent.

14. An extruded polymeric foam comprising:

a foamable polymeric material, the material comprising:

a polymer composition;

a flame retardant composition comprising a brominated polymeric compound, at least one of a synergist or a stabilizer, and a carrier resin; and a blowing agent composition consisting of one or more hydrofluorocarbons;

wherein the foamable polymeric mixture is devoid of additional blowing agents, wherein the brominated polymeric compound comprises from 0.05 wt. % to 0.35 wt. % of the foamable polymeric material excluding the blowing agent composition, and wherein the extruded polymeric foam comprises from 0.01 wt. % to 0.21 wt. % bromine.

15. The extruded polymeric foam of claim 14, wherein the brominated polymeric compound comprises a block copolymer of polystyrene and brominated polybutadiene, wherein the brominated polymeric compound has a bromine content less than 70 wt. %.

16. The foamable polymeric mixture of claim 1, wherein the single blowing agent composition consists of one or more hydrofluorocarbons.

17. The foamable polymeric mixture of claim 1, wherein the brominated polymeric compound comprises from 0.1 wt. % to 0.3 wt. % of the foamable polymeric mixture excluding the single blowing agent composition.

18. The extruded polymeric foam of claim 7, wherein:

the single blowing agent composition consists of one or more hydrofluorocarbons.

* * * * *